United States Patent
Yokota et al.

(10) Patent No.: US 7,657,176 B2
(45) Date of Patent: Feb. 2, 2010

(54) METHOD, APPARATUS, AND SYSTEM FOR EVALUATING FAULTY POINT IN MULTI-STAGE OPTICAL AMPLIFYING AND REPEATING TRANSMISSION LINE

(75) Inventors: Izumi Yokota, Kawasaki (JP); Katsuji Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 11/197,595

(22) Filed: Aug. 5, 2005

(65) Prior Publication Data
US 2006/0216038 A1 Sep. 28, 2006

(30) Foreign Application Priority Data
Mar. 22, 2005 (JP) .............................. 2005-082732

(51) Int. Cl.
H04B 10/08 (2006.01)
H04B 10/00 (2006.01)
(52) U.S. Cl. ................................ 398/10; 398/6; 398/11
(58) Field of Classification Search ..................... 398/6, 398/9–11, 17–18, 104–105, 13–14, 20, 25, 398/34, 37–38; 359/341
See application file for complete search history.

(56) References Cited

U.S. PATENT DOCUMENTS

| 4,947,459 | A | | 8/1990 | Nelson et al. | |
|---|---|---|---|---|---|
| 5,117,303 | A | * | 5/1992 | Desurvire et al. | 359/341.1 |
| 5,481,390 | A | | 1/1996 | Naito | |
| 5,513,029 | A | * | 4/1996 | Roberts | 398/32 |
| 6,452,701 | B1 | * | 9/2002 | Terahara et al. | 398/30 |
| 6,639,701 | B1 | * | 10/2003 | Hirst | 398/5 |
| 6,891,851 | B1 | * | 5/2005 | Demakakos | 370/467 |
| 2003/0016410 | A1 | * | 1/2003 | Zhou et al. | 359/110 |

FOREIGN PATENT DOCUMENTS

| EP | 0 531 047 | 8/1992 |
|---|---|---|
| GB | 2 267 792 | 12/1993 |

(Continued)

OTHER PUBLICATIONS

Katsuo et al., machine translation.*

(Continued)

Primary Examiner—Quan-Zhen Wang
(74) Attorney, Agent, or Firm—Hanify & King, PC (57) ABSTRACT

A method, apparatus, and system for evaluation of a faulty point in a multi-stage optical amplifying and repeating transmission line which provides a totally new technique for searching for faults neither of the typical "command response type" or the "DCR method". When a fault occurs in an optical submarine cable, the profile exhibited by the optical spectral characteristics of the optical noise signal (ASE) successively amplified through the chain of optical amplifying repeaters at the downstream side of the faulty point changes in accordance with the number of the repeaters. The technique finds the number of the repeaters until the faulty point based on the change in the profile so as to evaluate the location of the faulty point and has a step (S11) of monitoring the optical spectrum at the light receiving end and a step (S12) of determining the location of the faulty point from the monitored optical spectrum.

5 Claims, 12 Drawing Sheets

FOREIGN PATENT DOCUMENTS

JP      05327621 A     12/1993
JP      07240718 A      9/1995

OTHER PUBLICATIONS

J. Prat and S. Ruiz-Moreno, "Transparent supervision of optically amplified fiber links with received signal and ASE monitoring", Optics Communications 183 (2000), pp. 65-71.*

C. R. Giles and E. Desurvire, "Modeling Erbium-doped fiber amplifiers", J. Lightwave Tech. 9, (1991), pp. 271-283.*

E. Desurvire and J. Simpson, "Amplification of spontaneous emission in erbium doped single-mode fibers", J. Lightwave Tech. 7, (1989), pp. 835-845.*

Stanic S et al. "On Monitoring transparent optical networks" Parallel Processing Workshops 2002. Proceedings. International Conference on Aug. 18-21, 2002, Piscataway, NJ, USA, IEEE, Aug. 18, 2002, pp. 217-223, xP010608451 ISBN: 0-7695-1680-7.

* cited by examiner

FIG. 14
PRIOR ART

METHOD, APPARATUS, AND SYSTEM FOR EVALUATING FAULTY POINT IN MULTI-STAGE OPTICAL AMPLIFYING AND REPEATING TRANSMISSION LINE

BACKGROUND OF THE INVENTION

1. Field of the Invention

The present invention relates to a method for evaluating a faulty point occurring in the middle of a multi-stage optical amplifying and repeating transmission line, particularly a transmission line of an optical submarine cable engaged in multi-stage optical amplifying and repeating operations, an apparatus for evaluating a faulty point, and a system for evaluating a faulty point. Note that below, an optical submarine cable using an optical fiber as a signal transmission line will be explained as a preferable example.

2. Description of the Related Art

As is well known, optical submarine cables are used for extremely long distance optical transmission of as much as several 1000 km for example for crossing the oceans. Such extremely long distance optical submarine cables have a high probability of breakage and other faults due to various factors. In addition, searching for a faulty point in that very long distance, in particular searching for it quickly, is becoming increasingly difficult. However, to provide a high level of quality of service, taking several hours or another long time for searching for a fault is unacceptable.

Therefore, in the past, various techniques have been proposed for searching for faults. For example, there are the art described in Japanese Unexamined Patent Publication (Kokai) No. 5-327621 and Japanese Unexamined Patent Publication (Kokai) No. 7-240718. In general, a multi-stage optical amplifying and repeating submarine cable is comprised of an optical signal system for multi-stage optical amplifying and repeating an optical signal as it is and a power supply system for giving optical amplifying energy to the optical signal system. Japanese Unexamined Patent Publication (Kokai) No. 5-327621 proposes a new way to search for faults through the power supply system, while Japanese Unexamined Patent Publication (Kokai) No. 7-240718 proposes a new way to search for faults through the optical signal system.

A typical related art searching for a fault through the optical signal system transmits an optical command from at least one of the units of terminal equipment provided at the two ends of the submarine cable to each of the large number of optical amplifying repeaters inserted in the optical submarine cable one by one in order from the nearest one on out, confirms an optical response to this one at a time, and, if no optical response is received, estimates that the fault has occurred from there.

Such a command response system for searching for a fault has a high precision since it is a so-called "pinpoint" type of search. However, even if performing this search automatically using software, several seconds to several tens of seconds are required for the command response operation for each optical amplifying repeater, so sometimes a tremendous amount of time of several hours ends up being taken. This makes this method unsuitable for the "high speed fault search" aimed at by the present invention.

Figure 10A:
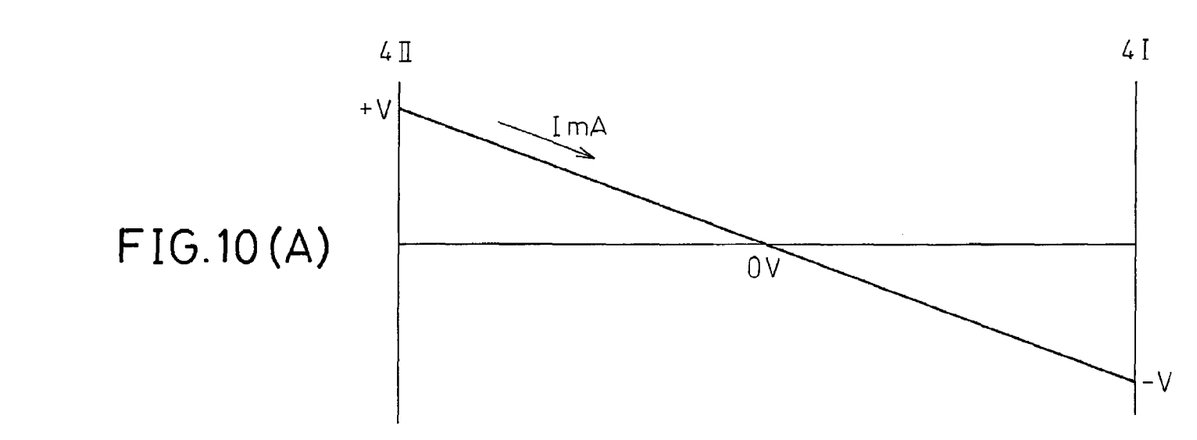
FIGS. 10A and 10B are views for explaining the DCR method.
Figure 10B:
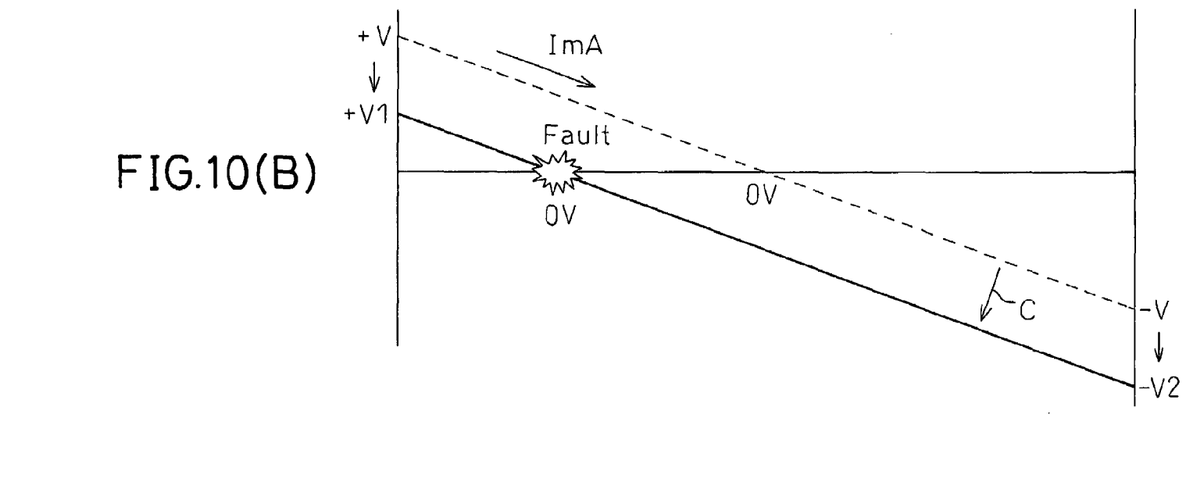

On the other hand, a typical related art searching for a fault through the power supply system supplies power to the two ends or one end of the optical submarine cable from power supply apparatuses provided together with the units of terminal equipment at the two ends of the cable and judges a fault location from the change in the power supply voltage occurring along with a fault in the middle of the optical submarine cable by the direct current resistance (DCR) method. (See the later explained FIG. 10.)

The DCR method does not require any software as explained above, has an extremely short fault search time, and thereby matches with the "high speed fault search" aimed at by the present invention.

However, with the DCR method utilizing the power supply system, there are the problems that (i) from the nature of the DCR method, detection of faults occurring near the midpoint of an optical submarine cable is difficult and (ii) with a fault occurring at an optical submarine cable, the DC resistance will fluctuate depending on the state of the fault, for example, the location of breakage of the optical submarine cable, and therefore stable identification of the faulty point will not be possible. That is, the DCR method enables high speed fault searches, but it is difficult to get high speed fault searches which always give reliable and stable results for faults occurring at an optical submarine cable.

SUMMARY OF THE INVENTION

An object of the present invention is to provide a method, apparatus, and system for evaluation of a faulty point in a multi-stage optical amplifying and repeating transmission line which enable as high a speed of fault searches as with the DCR method of course, eliminate the problems in the DCR method, and enable realization of searches for faults even in the vicinity of the midpoint.

The present invention provides a totally new technique for searching for faults neither of the typical "command response type" or the "DCR method" of the related art. That is, it provides a technique for searching for faults using the optical spectrum of an optical noise signal. Note that the basic principle of this technique for searching for faults utilizing the optical spectrum will be explained later (see FIG. 4 to FIG. 7).

Figure 1:
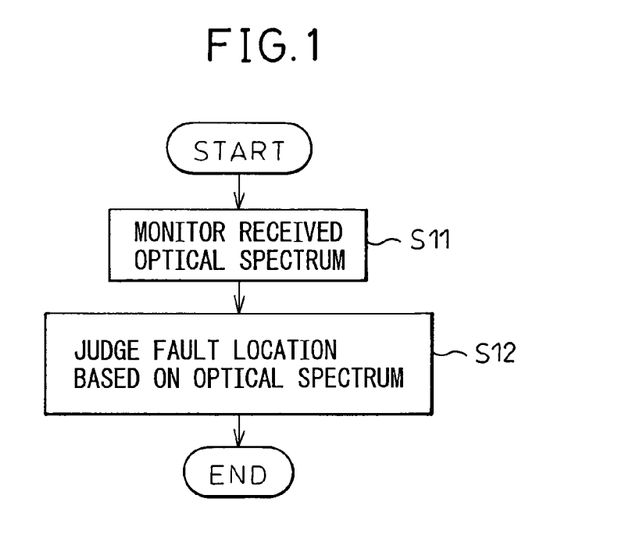
FIG. 1 is a flow chart showing the method of evaluating a faulty point based on the present invention.

When a fault occurs in an optical submarine cable (2), the profile exhibited by the optical spectral characteristics of the optical noise signal (ASE) successively amplified through the chain of optical amplifying repeaters at the downstream side of the faulty point changes in accordance with the number of the repeaters. The present invention takes note of this and finds the number of the repeaters until the faulty point based on the change in the profile so as to evaluate the fault location. Therefore, as shown in FIG. 1, the invention has a step (S11) of monitoring the optical spectrum at the light receiving end and a step (S12) of determining the fault location from the monitored optical spectrum.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

FIG. 1 is a flow chart showing a method for evaluating a faulty point based on the present invention. The method of evaluation of this figure is predicated on a method of evaluating a faulty point in a multi-stage optical amplifying and repeating transmission line (optical submarine cable system) where a plurality of optical amplifying repeaters are inserted at predetermined intervals in an optical cable and is based on a first step S11 and a second step S12 shown in the figure.

The first step S11 is a step of monitoring at a light receiving end of the optical cable the optical spectrum of an optical noise signal successively amplified through a chain of optical amplifying repeaters at a downstream side of the faulty point, while the second step S12 is a step of judging the fault location from the monitored optical spectrum of the optical noise signal.

If explaining the second step S12 more specifically, the second step S12 estimates the number of repeaters from the degree of change of the optical spectrum and judges the fault location from this. The optical spectrum changes depending on the number of repeaters in the chain of optical amplifying repeaters.

According to the present invention, a completely new method for searching for a faulty point called the "optical spectrum method" belonging to neither the "command response type" nor the "DCR method" is realized.

Figure 13:
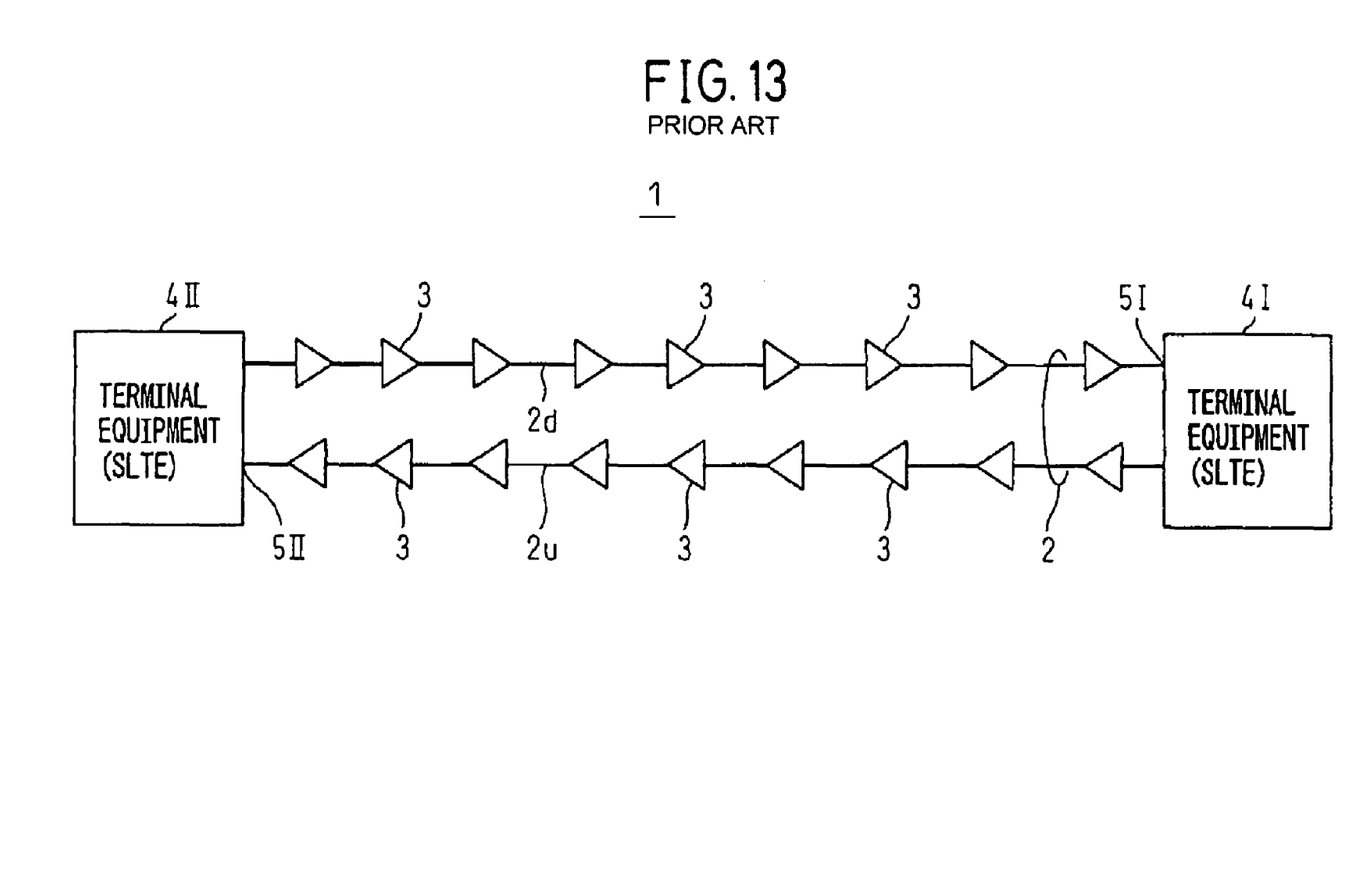
FIG. 13 is a diagram view of a known multi-stage optical amplifying and repeating transmission line (submarine cable) to which the present invention can be applied.

FIG. 13 is a view of a general multi-stage optical amplifying and repeating transmission line (optical submarine cable system) to which the present invention can be applied. In the figure, reference numeral 1 shows a multi-stage optical amplifying and repeating transmission line. In the embodiments, it is an optical submarine cable system.

The optical cable 2 forming the transmission line (optical submarine cable system) 1 is comprised of a pair of a down channel optical cable 2$d$ and an up channel optical cable 2$u$. Each of these has a plurality of optical amplifying repeaters 3 inserted at for example predetermined intervals. The ends of the optical cable 2 have units of submarine line terminal equipment (SLTE) 4 attached to them as landing stations which terminate the optical cable 2. In the figure, a first light receiving end 5I of the optical cable 2 is provided with a first unit of terminal equipment 4I, and a second light receiving end 5II of the optical cable system 2 is provided with a second unit of terminal equipment 4.

Figure 14:
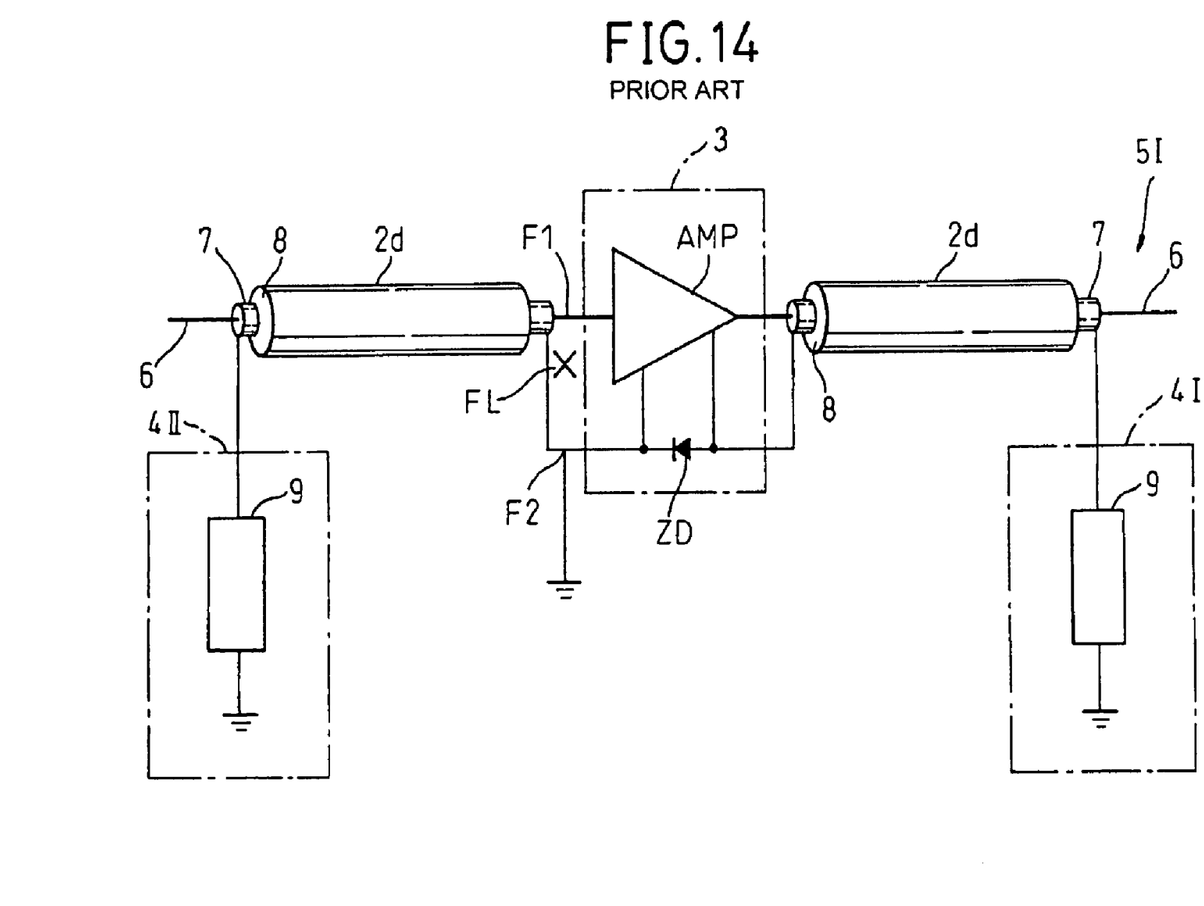
FIG. 14 is a view of a known example of a power supply system not shown in FIG. 13.

FIG. 14 is a view showing a known example of a power supply system not shown in FIG. 13. For simplification, only one optical amplifying repeater 3 is shown. Further, only the down channel optical cable 2$d$ is shown (the same is true for the up channel optical cable 2$u$).

The optical cable 2$d$ is comprised of an optical fiber 6 arranged at its center, a metal tube 7 made of copper surrounding the optical fiber 6 via packing, and a sheath 8 protecting these from the outside.

The power supply system being looked at here includes the metal tube 7 and constant current sources 9 provided at the two ends of the power supply system. A power supply line formed by these has a Zener diode ZD inserted in series for each optical amplifying repeater (3). The constant voltage produced at each Zener diode ZD powers an optical amplifying unit AMP. This AMP uses a rare earth element doped fiber.

Now, here, assume that a fault has occurred in the optical cable of FIG. 13. This fault is almost always a break in the optical cable 2 seen from past statistics. Further, the break is almost always a short-circuit as seen from past statistics. This short-circuit means a ground fault to the seawater or ocean floor. Referring again to FIG. 14, the optical fiber 6 ends up completely broken at F1 due to the above fault (X), but the power supply system is ground at the seawater or ocean floor at F2 and therefore in the final analysis power continues to be supplied. That is, the optical fiber 6 entering the optical amplifying unit AMP is broken, but the optical amplifying unit AMP continues to be supplied with power. The present invention is a technique for searching for a fault functioning particularly effectively under such a circumstance.

Figure 2:
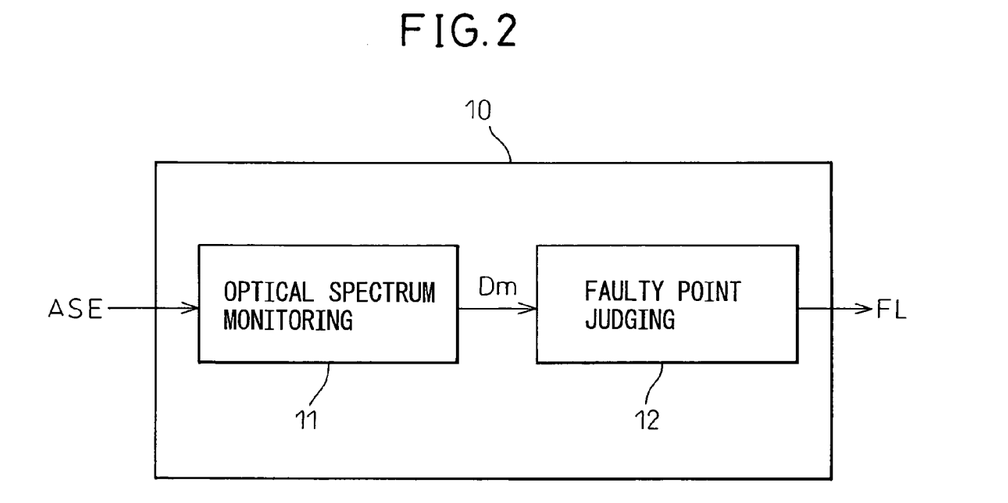
FIG. 2 is a view of the basic configuration of an apparatus for evaluating a faulty point based on the present invention.

FIG. 2 is a view of the basic configuration of a faulty point evaluation apparatus according to the present invention. The faulty point evaluation apparatus 10 is an apparatus for evaluating the faulty point in a multi-stage optical amplifying and repeating transmission line 1 into which a plurality of optical amplifying repeaters 3 are inserted at predetermined intervals and is comprised of the illustrated optical spectrum monitoring means 11 and faulty point judging means 12.

Here, the optical spectrum monitoring means 11 monitors at the light receiving end 5I of the optical fiber 6 the optical spectrum of the optical noise signal ASE successively amplified through the chain of optical amplifying repeaters 3 (R1, R2 . . . Rn of FIG. 3) through the chain of optical amplifying repeaters 3 at the downstream side of the faulty point. A faulty point judging means 12 receives as input monitoring data of the optical spectrum from the optical spectrum monitoring means 11 (Dm (monitor)) and judges the fault location FL.

Figure 3:
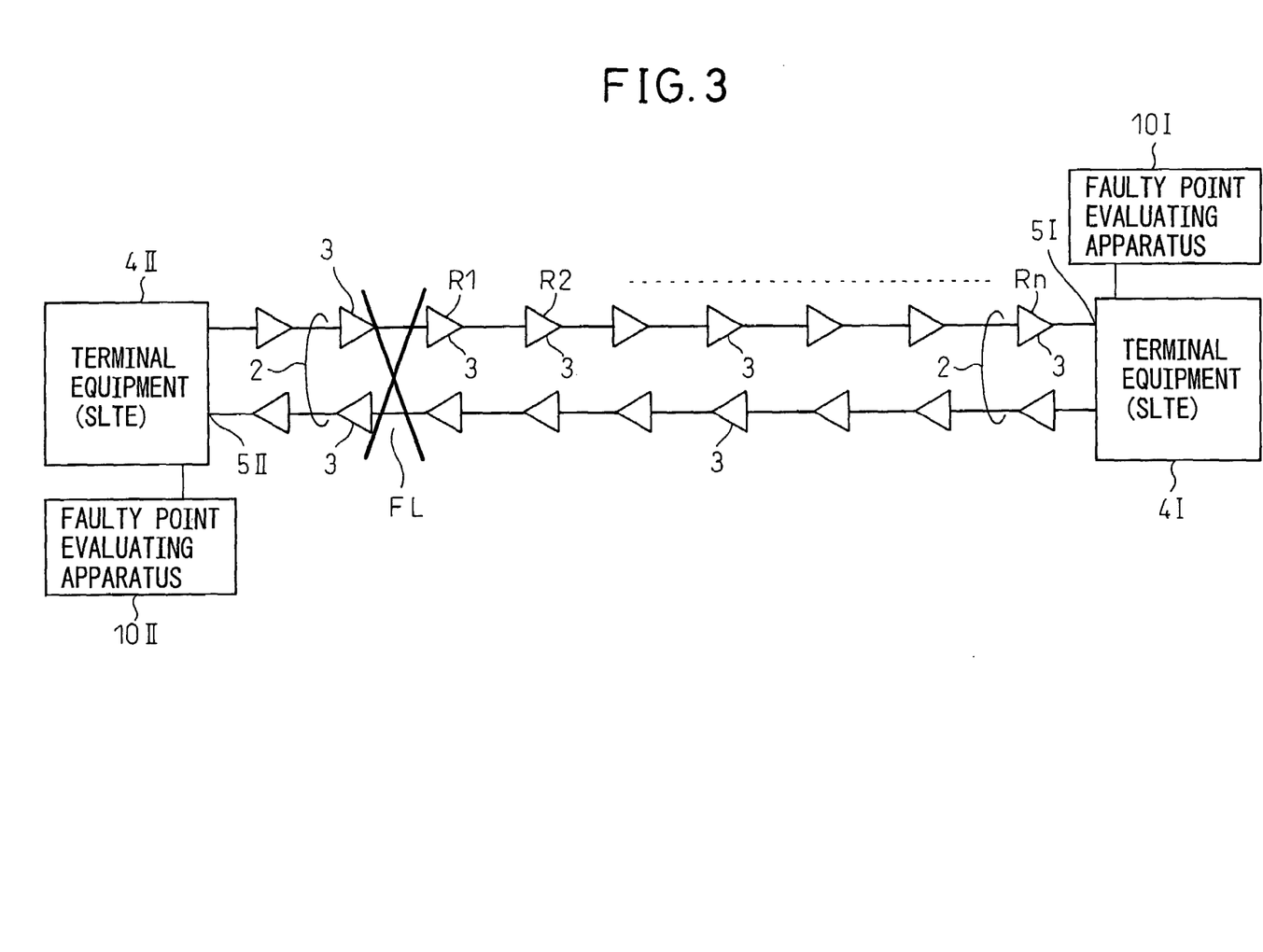
FIG. 3 is a view of the state of introduction of faulty point evaluation apparatuses of FIG. 2 in a system of FIG. 13.

FIG. 3 is a view of the state of insertion of the faulty point evaluation apparatuses of FIG. 2 in the system of FIG. 13. In the figure, the blocks shown by reference numerals 10 are the faulty point evaluation apparatuses shown in FIG. 2. The apparatuses 10 added to the first and second units of terminal equipment 4I and 4II are shown by reference numerals 10I and 10II respectively. Each apparatus (10I and 10II) is completely the same in configuration. The functions are also completely the same between the two. Therefore, the following explanation will be given with reference mainly to the first unit faulty point evaluation apparatus 10I.

The first faulty point evaluation apparatus 10I, first, splits off part of the optical signal from the first light receiving end 5I for input and monitors the optical spectrum of the optical spectrum. The optical spectrum in this case is an optical noise signal successively amplified through the chain of optical amplifying repeaters 3 (in the figure, R1, R2 . . . Rn) at the downstream side from the fault location (X) FL of FIG. 3 (therefore, from which the input signal is cut), that is, the amplified spontaneous emission (ASE).

Figure 4:
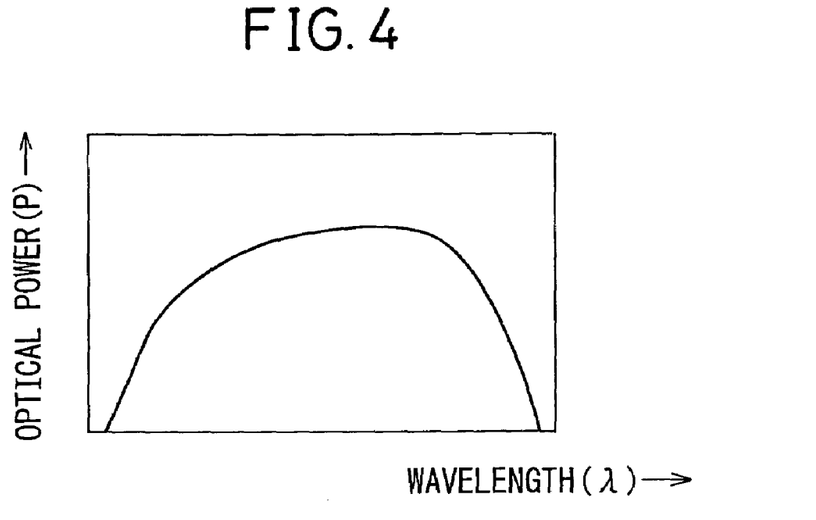
FIG. 4 is a view of the optical spectral characteristics monitored in a faulty point evaluation apparatus 10I of FIG. 3.
Figure 5:
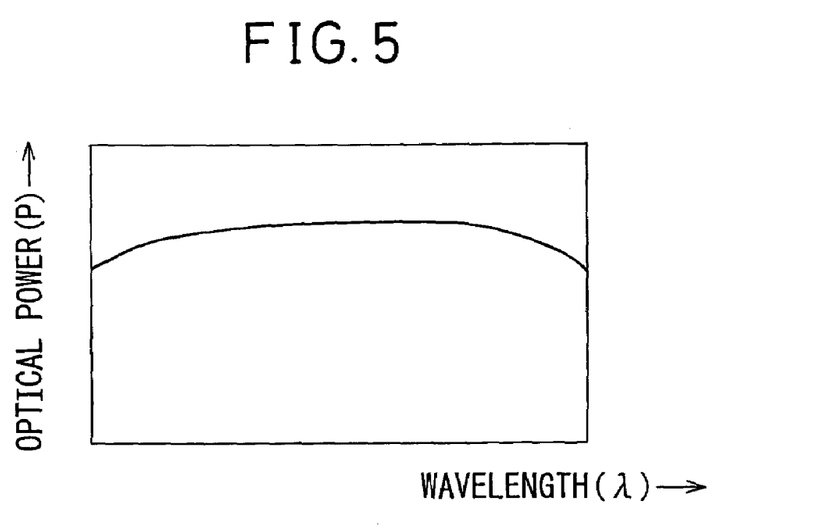
FIG. 5 is a view of the optical spectral characteristics monitored in a faulty point evaluation apparatus 10II of FIG. 3.

FIG. 4 is a view of the optical spectrum characteristics monitored in the faulty point evaluation apparatus 10I of FIG. 3. FIG. 5 is a view of the optical spectrum characteristics monitored in the faulty point evaluation apparatus 10II of FIG. 3. Comparing the optical spectrum characteristics shown in FIG. 4 and FIG. 5, it will be understood that there is a remarkable difference between the two profiles.

Specifically, the profile of the optical spectrum characteristics shown by the optical noise signal ASE successively amplified through the down channel optical cable 2d with the large number of repeaters in the chain of optical amplifying repeaters 3 at the downstream side of the faulty point (X) in FIG. 3 forms a peak shape falling at the two sides of an amplifying band as shown in FIG. 4.

On the other hand, the profile of the optical spectrum characteristics shown by the optical noise signal ASE successively amplified by the optical amplifying repeaters 3 with few repeaters in the chain of optical amplifying repeaters 3 along the up channel optical cable 2u at the downstream side of the faulty point (X) in FIG. 3 is relatively flat over the entire amplifying band as shown in FIG. 5. That is, the profile changes in accordance with the distance from the unit of the terminal equipment 4 to the faulty point (X).

Figure 6:
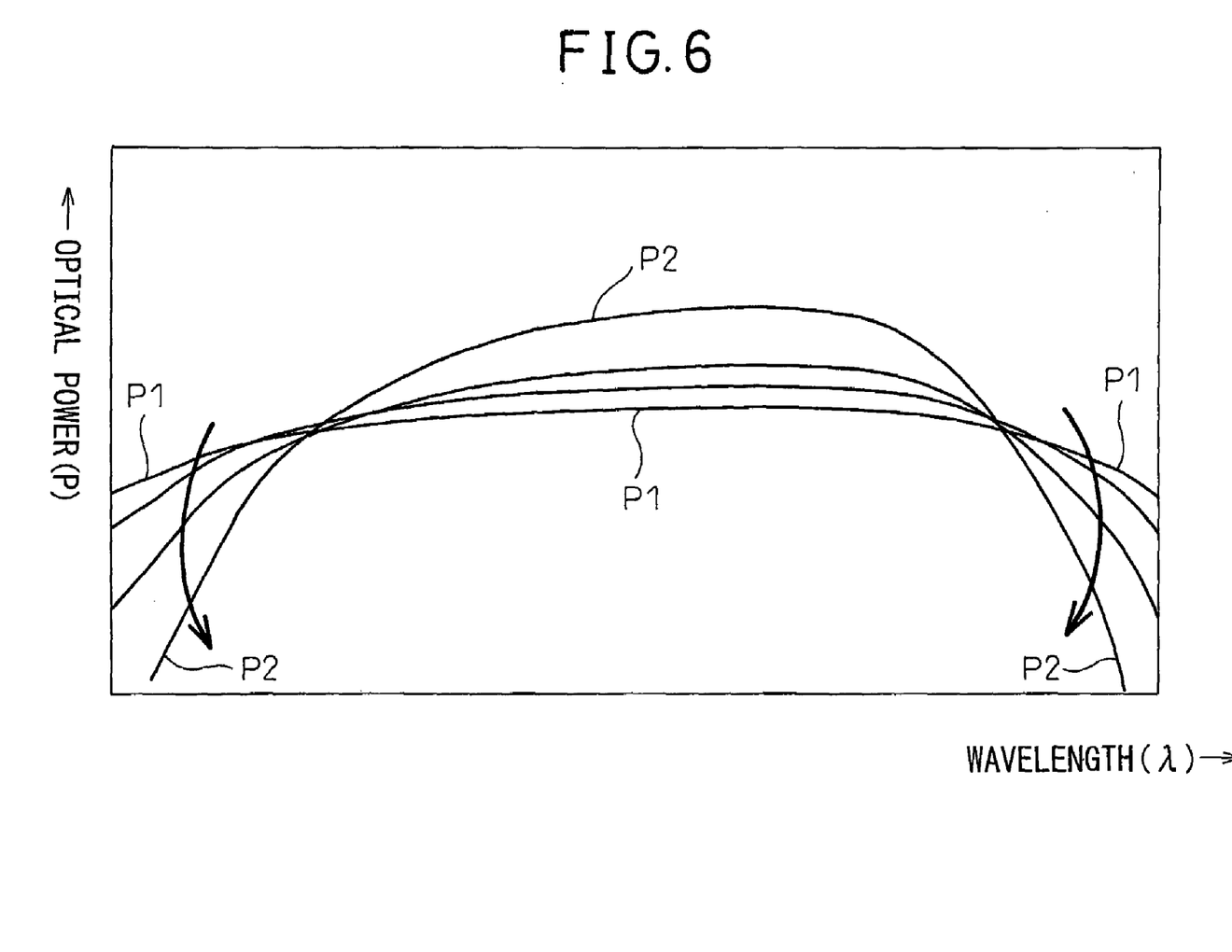
FIG. 6 is a view showing the dependency of the optical spectrum characteristics on the number of repeaters.

FIG. 6 is a view of the dependency of the optical spectrum characteristics on the number of repeaters. The figure should be viewed in the same way as FIG. 4 and FIG. 5. In the figure, the profile P1 shows the case with few number of repeaters of the optical amplifying repeaters by which the optical noise signal is successively amplified, while the profile P2 shows the case with a large number of repeaters. The profile in the case of a number of repeaters between the two is a distribution between the profiles P1 and P2. In the final analysis, the greater the number of repeaters, the more remarkable the drop in the optical power at the two ends of the amplifying band (λ).

Therefore, the optical spectrum measuring means 11 of FIG. 2 monitors the profile of the optical spectrum shown in FIG. 6 and transfers the monitoring data Dm to the faulty point judging means 12 of FIG. 2. This faulty point judging means 12 identifies the degree of deterioration of the profile (P1 to P2) in accordance with the monitoring data Dm and judges the number of repeaters based on the identified degree of deterioration. That is, it judges that the point going back by the number of repeaters is the location of occurrence of the faulty point to be evaluated.

Here, the phenomenon why the profile of the optical spectrum shown in FIG. 6 is obtained will be analyzed. If the optical cable system 2 breaks at the faulty point (X) of FIG. 3 and optical input from the optical fiber 6 to the optical amplifying unit (AMP of FIG. 14) is broken in the state with power supplied as explained above, only the pumping light from the rare earth doped fiber will be input to the AMP. Further, the energy of the pumping light becomes ASE which is sent to the next AMP where that ASE is again amplified. This process is repeated until the light receiving end 5I. This will be explained with reference to the drawings.

Figure 7:
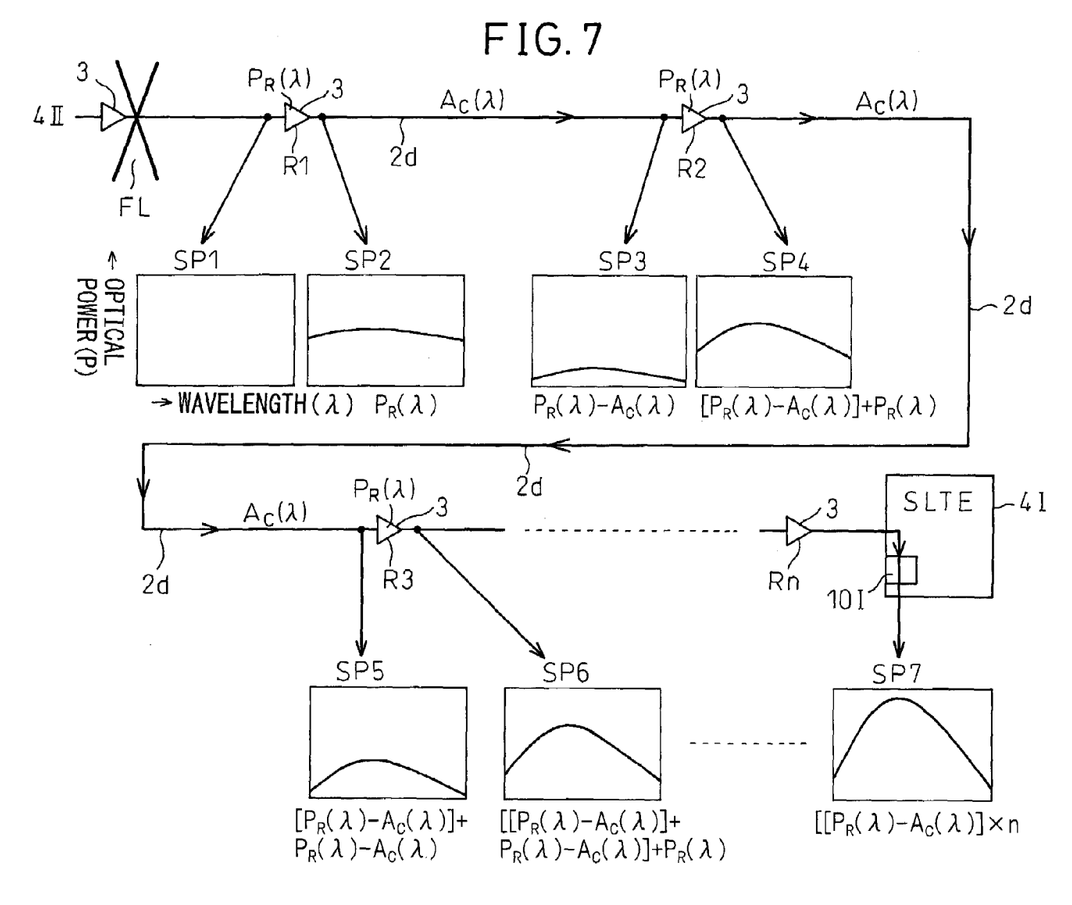
FIG. 7 is a view showing the profile of optical spectrum characteristics of ASE sucessively repeated and amplified by optical amplifying repeaters.

FIG. 7 is a view of the profile of the optical spectrum characteristics of ASE successively amplified and repeated in the optical amplifying repeaters 3. First, the optical signal right after the faulty point (X) is cut off from input, so the optical spectrum characteristics does not appear at all like in SP1. However, at the first optical amplifying repeater (R1) 3, as explained above, the energy of the pumping light appears as ASE and the optical spectrum characteristics becomes like SP2. Each optical amplifying repeater 3 is feedback controlled and becomes like SP2 so that a predetermined constant optical power is output. Further, the optical spectrum of the output of the optical amplifying repeater 3 is usually a peak shape, so in general an equalizer is used together with this so as to flatten the peak shape as much as possible. Further, even at the SP2, the peak shape tends to appear a bit.

The optical noise signal ASE amplified by the optical amplifying repeater (R1) 3 causes transmission loss when propagated through the optical fiber 6. At the input of the next optical amplifying repeater (R2) 3, the optical power attenuates as shown by SP3. However, it is again amplified at this R2 and therefore the optical spectrum characteristics of the ASE becomes like that shown in SP4.

Similarly, the ASE reaches the R3 (SP5) accompanied with transmission loss, is again optically amplified at this R3, and finally becomes the ASE optical spectral characteristic such as shown by SP7.

In this way, the optical spectrum characteristics shows an increase in optical power at the center of the amplifying band each time the number of repeaters is increased and a decrease in the optical power at the two ends of the amplifying band by that amount. This is because the total light energy at the amplifying band as a whole is invariable. Note that the optical spectrum characteristics (SP1, SP2, SP3 to SP6) in FIG. 7 show the profiles measured by the means 11 when placing optical spectrum monitoring means (11 in FIG. 2) there. Therefore, if a profile like SP2 is observed at the evaluation apparatus 10I of FIG. 3, it is estimated that the fault has occurred at a location closest to the unit of the terminal equipment 4I, while conversely if a profile like SP7 is observed at the evaluation apparatus 10I, it is estimated that the fault has occurred at a location considerably far from the unit of the terminal equipment 4I. In this case, the estimate is made only by the distance from the faulty point. In actuality, it is not possible to judge at what repeater 3 the fault has occurred. Therefore, this judgment is performed by the faulty point judging means (12 in FIG. 2). The specific technique for judgment will be explained later, but the optical power of the optical noise signal ASE monitored at the optical spectrum measuring means 11 is considerably faithfully proportional to the number of repeaters, so this proportionality may be used for considerably accurate judgment.

Expressing this proportionality by a numerical equation, the following equation (1) is obtained, $$P_A(\lambda) = [P_R(\lambda) - Ac(\lambda)] \times n \quad (1)$$

where, $P_A(\lambda)$: received optical power monitored by monitoring means 11
$P_R(\lambda)$: average gain characteristic of repeaters 3
$Ac(\lambda)$: average loss
n: number of repeaters 3

Further, $P_A(\lambda)$, $P_R(\lambda)$, and $Ac(\lambda)$ all are indicated by dB and can be calculated by simple addition. Note that the background behind why this can be expressed as in the above equation (1) will be clear from the optical powers shown directly under SP2, SP3, SP4, SP5, SP6, and SP7 in FIG. 7.

The degree of change of the optical spectrum changing in this way is analyzed at the faulty point judging means 12 of FIG. 2 and the fault location is specifically judged. The degree of deterioration of the optical spectrum can be selected from:
 (a) Degree of change of optical power at predetermined specific wavelength
 (b) Degree of change of difference between first optical power and second optical power at predetermined specific first wavelength and second wavelength (c) Degree of change of difference between maximum value and minimum value in optical spectrum This will be explained specifically using the drawings.

Figure 8:
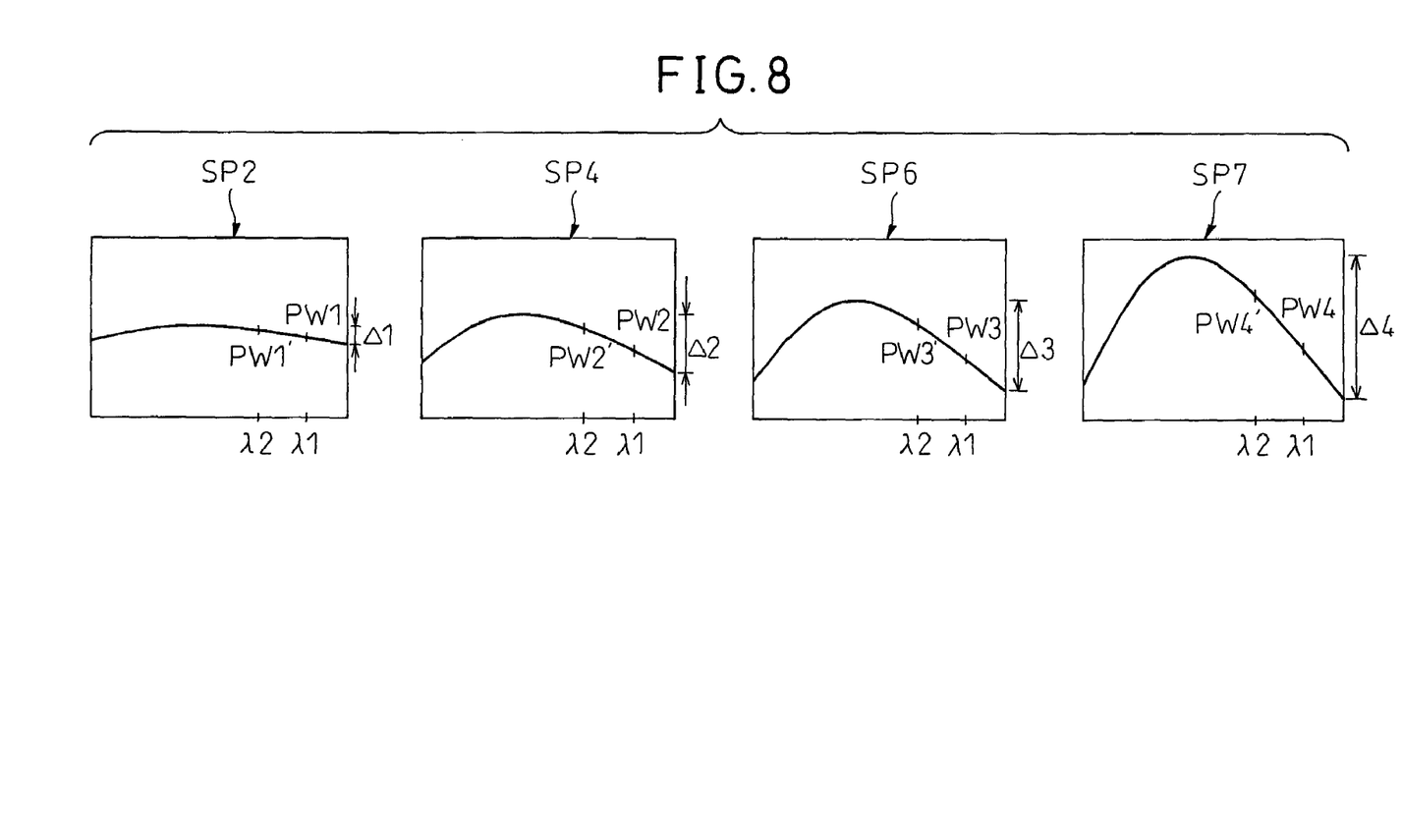
FIG. 8 is a view for explaining three modes defining the degree of deterioration of optical power.

FIG. 8 is a view for explaining the three modes defining the degree of change of optical power. This three modes are the three modes (a), (b), and (c) explained above. Note that as the profile of the optical spectrum of this figure, for convenience sake, the optical spectrums SP2, SP4, SP6, and SP7 shown in FIG. 7 are diverted for use.

In the first mode (a), the degrees of change PW1, PW2, and PW3 of the optical power (PW) at a predetermined specific wavelength $\lambda 1$ are analyzed by the means 12. In the second mode (b), the differences (PW1'-PW1), PW2'-PW2, PW3'-PW3, and PW4'-PW4) between the first optical powers (PW1, PW2, PW3, and PW4) and second optical powers (PW1', PW2', PW3', and PW4') at the predetermined specific first wavelength $\lambda 1$ and second wavelength $\lambda 2$ are analyzed by the means 12. In the third mode (c), the differences ($\Delta 1$, $\Delta 2$, $\Delta 3$, and $\Delta 4$) between the maximum value and minimum value at the optical spectrums are analyzed by the means 12. A specific example of the means 12 is shown in the drawings.

Figure 9:
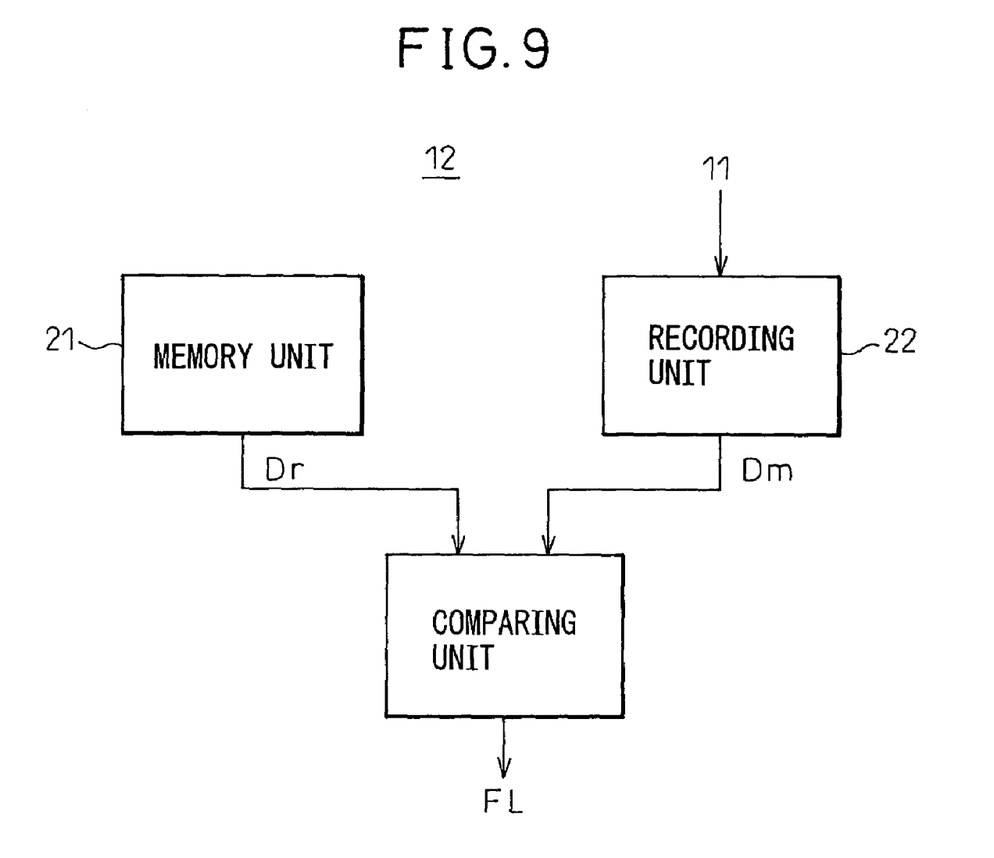
FIG. 9 is a view showing a specific example of a faulty point judging means 12 shown in FIG. 2.

FIG. 9 is a view of a specific example of the faulty point judging means 12 shown in FIG. 2. As shown in the drawing, the means 12 has a memory unit 21. The memory unit 21 holds reference data Dr for optical spectrums acquired in advance by experiments or simulations conducted on optical cable systems 2. Further, it has a recording unit 22 and comparing unit 23. The recording unit 22 records monitoring data Dm from the optical spectrum measuring means 12. The comparing unit 23 compares the monitoring data Dm in the recording unit 22 and the reference data Dr in the memory unit 21 and judges the fault location FL based on this comparison.

The above judgment of the faulty point was explained focusing on the down channel optical cable 2d, but as shown in FIG. 3, it is also possible to execute the first step S11 and second step S12 shown in FIG. 1 at both of the first light receiving end 5I and second light receiving end 5II at the ends of the optical cable 2 comprised of the pair of the up channel optical cable 2u and the down channel optical cable 2d. If searching for a fault from the two ends of the optical cable system 2 in this way, the search precision is improved more.

Further, it is also possible to use the already explained DCR method at the same time for improving the search precision more. The DCR method has the above-mentioned problems (i) and (ii), but depending on the circumstance instantaneously provides extremely high precision faulty point judgment, so joint use of the DCR method is advantageous for the ASE optical spectrum method of the present invention.

That is, referring again to FIG. 13, it is possible to further provide a third step of judging by the DCR method the fault location FL from the power supply voltage changing by the occurrence of a fault (X) when the optical cable system 2 in the multi-stage optical amplifying and repeating transmission line 1 is supplied with power at both ends or one end (see FIG. 14). Further, if judging the fault location FL by combining the results of judgment at the third step and the second step, the judgment can be made more precisely and faster. Here, the DCR method will be explained simply using the drawings.

FIGS. 10A and 10B are views for explaining the DCR method. In the figure, the ordinate at the left side shows the power supply voltage (+V) at one terminal equipment 4II side, while the ordinate at the right side shows the power supply voltage (-V) at the other terminal equipment 4I side. If assuming now that no fault at all occurs (see (A) of top part), a constant current 1 mA flows from the +V side to the -V side. The gradient of this current is determined by the total resistance value of the power supply line (see 37 in FIG. 11). At the substantial midpoint of the optical cable system 2, the potential becomes 0V.

Here, when assuming that a fault occurs, the distribution of the current moves in parallel as shown by (B) while maintaining its gradient at (A) so that the ground fault point is made 0V (see arrow C). Therefore, at the terminating apparatus 4II (left side), the power supply potential changes from +V->+V1. On the other hand, at the terminating apparatus 4I side (right side), the power supply potential changes from -V->-V2. It is possible to find the fault location based on the magnitude of the change of potential. Below, a faulty point evaluation system using this DCR method as well will be explained.

Figure 11:
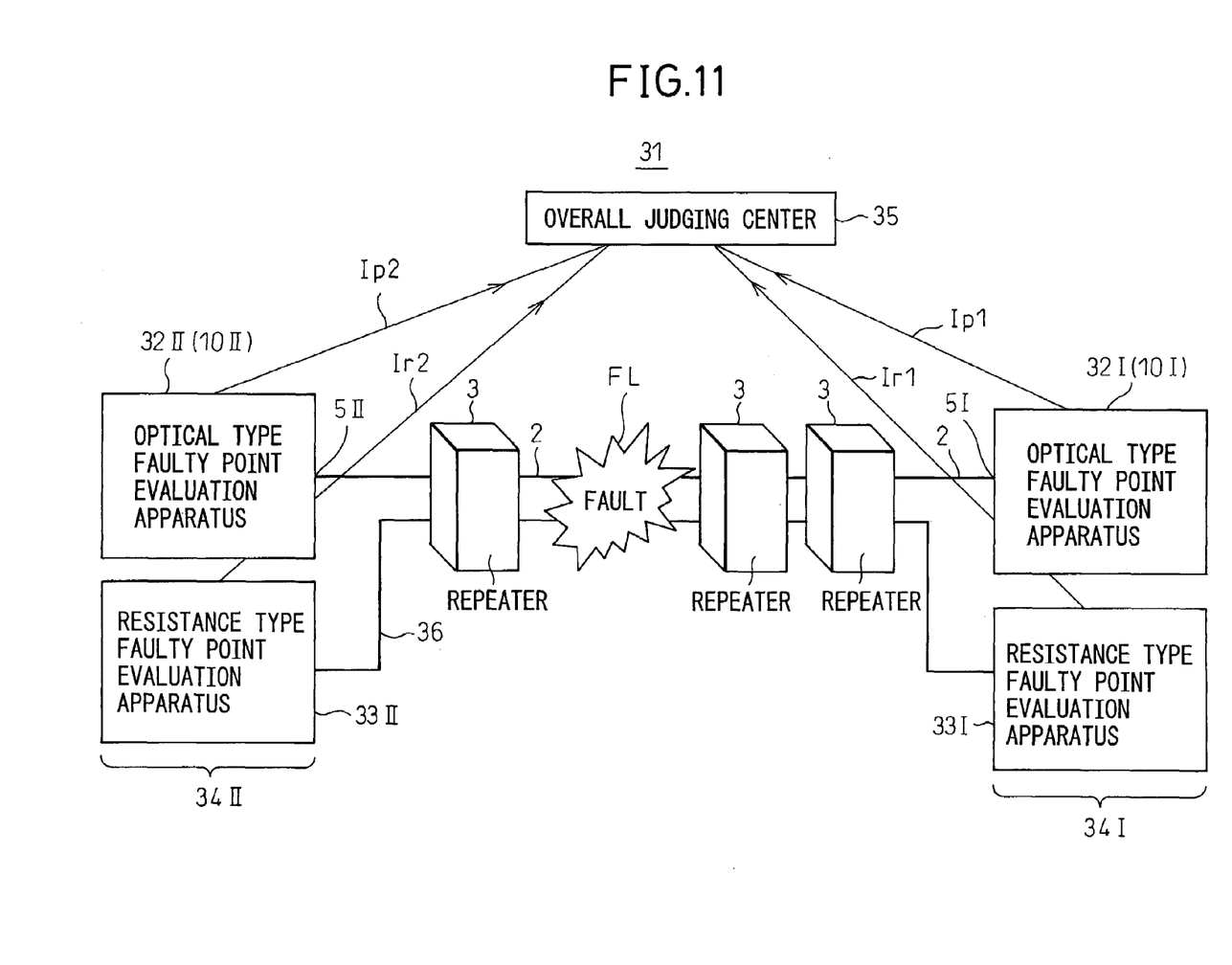
FIG. 11 is a view of a faulty point evaluation system according to the present invention.

FIG. 11 is a view of a faulty point evaluation system based on the present invention. In the figure, reference numeral 31 shows a faulty point evaluation system. The system 31 is provided with a faulty point evaluation subsystem 34I including an optical type faulty point evaluation apparatus 32I and a resistance type faulty point evaluation apparatus 33I and an overall decision center 35.

Here, the optical type faulty point evaluation apparatus 32I (corresponding to 10I in FIG. 3) is provided with an optical spectrum measuring means 11 for monitoring at the light receiving end 5I of the optical cable 2 the optical spectrum of the optical noise signal ASE successively amplified through the chain of optical amplifying repeaters 3 at the downstream side of the faulty point (X) when a fault occurs on the multistage optical amplifying and repeating transmission line 1 in which a plurality of optical amplifying repeaters 3 are inserted at predetermined intervals in the optical cable 2 and a faulty point judging means 12 for receiving as input the monitoring data Dm of the optical spectrum from the optical spectrum measuring means 11 and judging the fault location (FL).

Further, the resistance type faulty point evaluation apparatus 33I judges by the DCR method (FIG. 10) the fault location (FL) from the power supply potential. This potential changes depending on the occurrence of a fault on the power supply line 36 when supplying power to the optical cable system 2 at two ends or one end in the multi-stage optical amplifying and repeating transmission line 1.

Further, the overall judgment center 35 judges the fault location FL by combining the optical type faulty point evaluation information Ip1 and resistance type faulty point evaluation information Ir1 from the faulty point evaluation apparatuses 32I and 32II in the faulty point evaluation subsystem 34I.

The above explanation was made regarding the faulty point evaluation subsystem 34I of the right end of FIG. 11 (light receiving end 5I), but as already explained, if evaluating the faulty point simultaneously at the light receiving end 5II at the opposite side, even greater reliability would result.

That is, preferably, the faulty point evaluation subsystem is constructed from a first faulty point evaluation subsystem 34I provided at the first light receiving end 5I side at one end of the optical cable system 2 comprised of the up channel cable 2u and down channel optical cable 2d and a second faulty point evaluation subsystem 34II provided at the second light receiving end 5II at the other end of the optical cable 2. Further, the overall evaluation center 35 is configured to judge the fault location FL by combining the optical type faulty point evaluation information (Ip1, Ip2) and resistance type faulty point evaluation information (Ir1, Ir2) from the first and second faulty point evaluation subsystems 34I and 34II.

Figure 12:
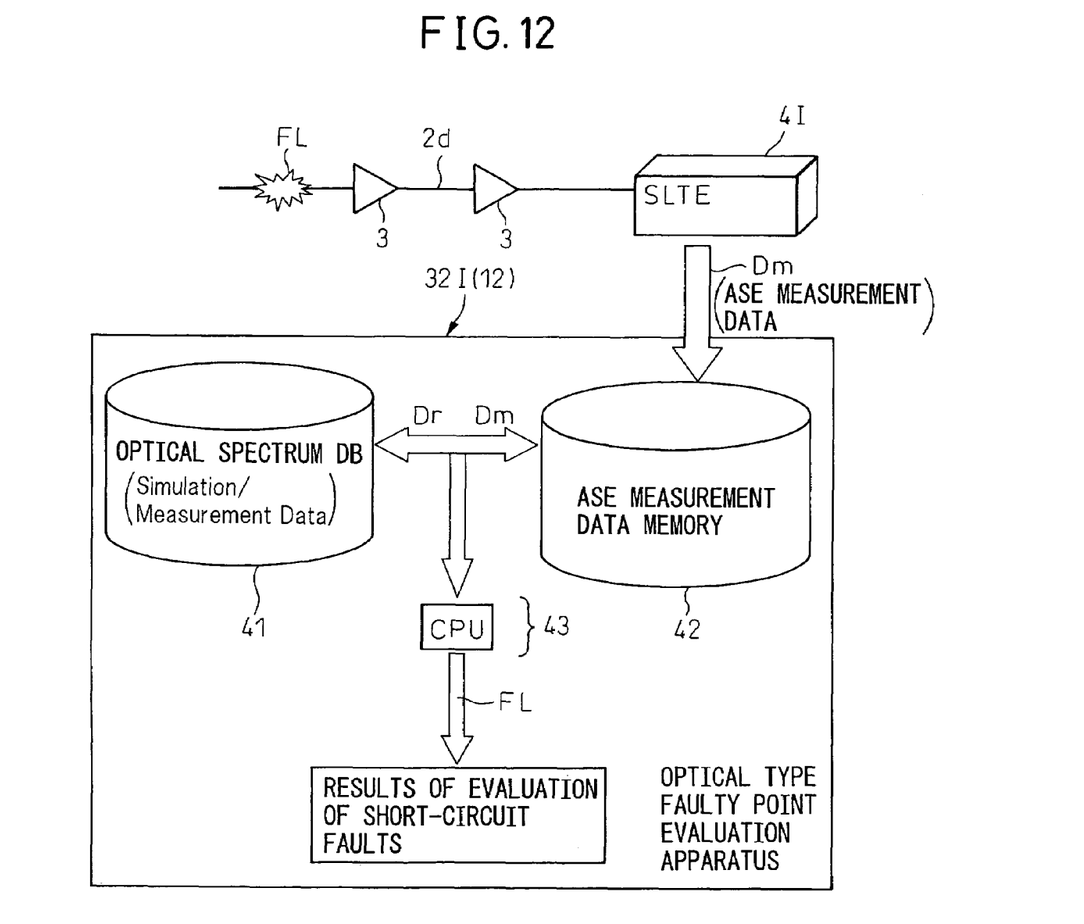
FIG. 12 is a view of a specific example of a faulty point evaluation system 32I of FIG. 11.

FIG. 12 is a view showing a specific example of the optical type faulty point evaluation apparatus 32I of FIG. 11 and in particular shows mainly the faulty point judging means 12 in FIG. 2. Therefore, the optical spectrum measuring means 11 of FIG. 2 is included in the unit of terminal equipment (SLTE) 4I in FIG. 12, so basically the configuration is equivalent to that shown in FIG. 9.

That is, the memory unit 21 and recording unit 22 shown in FIG. 9 are shown as the optical spectrum database (DB) 41 and the ASE measurement data memory 42 in FIG. 12. Further, the comparing unit 23 shown in FIG. 9 is shown as the CPU 43 in FIG. 12. It uses software for the comparison to obtain the "short circuit fault evaluation results" sought.

While the invention has been described with reference to specific embodiments chosen for purpose of illustration, it should be apparent that numerous modifications could be made thereto by those skilled in the art without departing from the basic concept and scope of the invention.

The invention claimed is:

1. A method of evaluating a faulty point in a multi-stage optical amplifying and repeating transmission line where a plurality of optical amplifying repeaters are inserted at predetermined intervals in an optical cable, comprising the steps of:
   monitoring, at an optical spectrum monitoring function unit, an optical spectrum of an optical noise signal successively amplified through a chain of optical amplifying repeaters at a downstream side of the faulty point at a light receiving end of the optical cable and
   judging, at a faulty point judging function unit, the location of the faulty point from the monitored optical spectrum of the optical noise signal, wherein said judging step estimates the number of repeaters from the degree of change of the optical spectrum characteristic curve which changes from a flat shape to a projection shape successively depending on the increase in the number, from the faulty point, of the repeaters, wherein the optical spectrum characteristic curve is depicted on a graph which is defined by a wavelength ($\lambda$) on an axis of an abscissa and an optical power (Pi) on an axis of an ordinate.

2. A method of evaluating a faulty point as set forth in claim 1, wherein the degree of change of the optical spectrum judged by a faulty point judging function unit is at least one of:
   (a) a degree of change of an optical power at a predetermined specific wavelength
   (b) a degree of change of a difference between a first optical power and a second optical power at a predetermined specific first wavelength and second wavelength
   (c) a degree of change of a difference between a maximum value and a minimum value in an optical spectrum.

3. A method of evaluating a faulty point as set forth in claim 1, wherein each of a light receiving end of an up channel optical cable and a light receiving end of a down channel optical cable executes said judging step and said monitoring step.

4. A faulty point evaluation apparatus for evaluating a faulty point in a multi-stage optical amplifying and repeating transmission line where a plurality of optical amplifying repeaters are inserted at predetermined intervals in an optical cable, comprising:
   an optical spectrum monitoring function unit for monitoring an optical spectrum of an optical noise signal successively amplified through a chain of optical amplifying repeaters at a downstream side of the faulty point at a light receiving end of the optical cable and a faulty point judging function unit receiving as input the monitored data of the optical spectrum from said optical spectrum monitoring function unit and judging the fault location; and
   wherein said faulty point judging function unit has a memory unit for holding reference data on optical spectrums acquired in advance by experiments or simulation conducted on said optical cable and a recording unit for recording said monitoring data from said optical spectrum monitoring function unit and a comparing function unit for comparing said monitoring data with said reference data in said memory unit and judging a fault location based on the comparison, wherein the reference data is defined by an optical spectrum characteristic curve depicted on a graph defined by a wavelength ($\lambda$) on an axis of an abscissa and an optical power (Pi) on an axis of an ordinate and the optical spectrum characteristic curve changes from a flat shape to a projection shape successively depending on an increase in a number, from the faulty point, of the repeaters.

5. A faulty point evaluation system comprising
   a faulty point evaluation subsystem comprising
      a first faulty point evaluation apparatus provided with an optical spectrum monitoring function unit for monitoring at a light receiving end of an optical cable pair an optical spectrum of an optical noise signal successively amplified through a chain of optical amplifying repeaters at a downstream side of a faulty point occurring in a multi-stage optical amplifying and repeating transmission line in which a plurality of optical amplifying repeaters are inserted into the optical cable at predetermined intervals and a faulty point judging function unit receiving as input monitoring data of said optical spectrum from said optical spectrum monitoring function unit and estimating the number of repeaters from the degree of change of the optical spectrum characteristic curve which is depicted on a graph which is defined by a wavelength ($\lambda$) on an axis of an abscissa and an optical power (Pi) on an axis of an ordinate and changes from a flat shape to a projection shape successively depending on the increase in the number, from the faulty point, of the repeaters and
      a second faulty point evaluation apparatus for judging the fault location by a direct current resistance method from a power supply potential changing in accordance with a fault when supplying power from both ends or one end of said optical cable in said multi-stage optical amplifying and repeating transmission line and
      an overall evaluation center for judging the fault location by combining first faulty point evaluation information and second faulty point evaluation information from said first and second faulty point evaluation apparatuses in said faulty point evaluation subsystem, wherein
   said faulty point evaluation subsystem is comprised of a first faulty point evaluation subsystem provided at a first light receiving end side at one end of said optical cable comprised of an up channel optical cable and a down channel optical cable and a second faulty point evaluation subsystem provided at a second light receiving end side at the other end of said optical cable,
   said overall evaluation center judges the fault location by combining first faulty point evaluation information and second faulty point evaluation information from said first and second faulty point evaluation subsystems.

* * * * *